(No Model.)
F. A. CUSHMAN.
EXCELSIOR CARRIER AND MIXER.
No. 245,941. Patented Aug. 23, 1881.
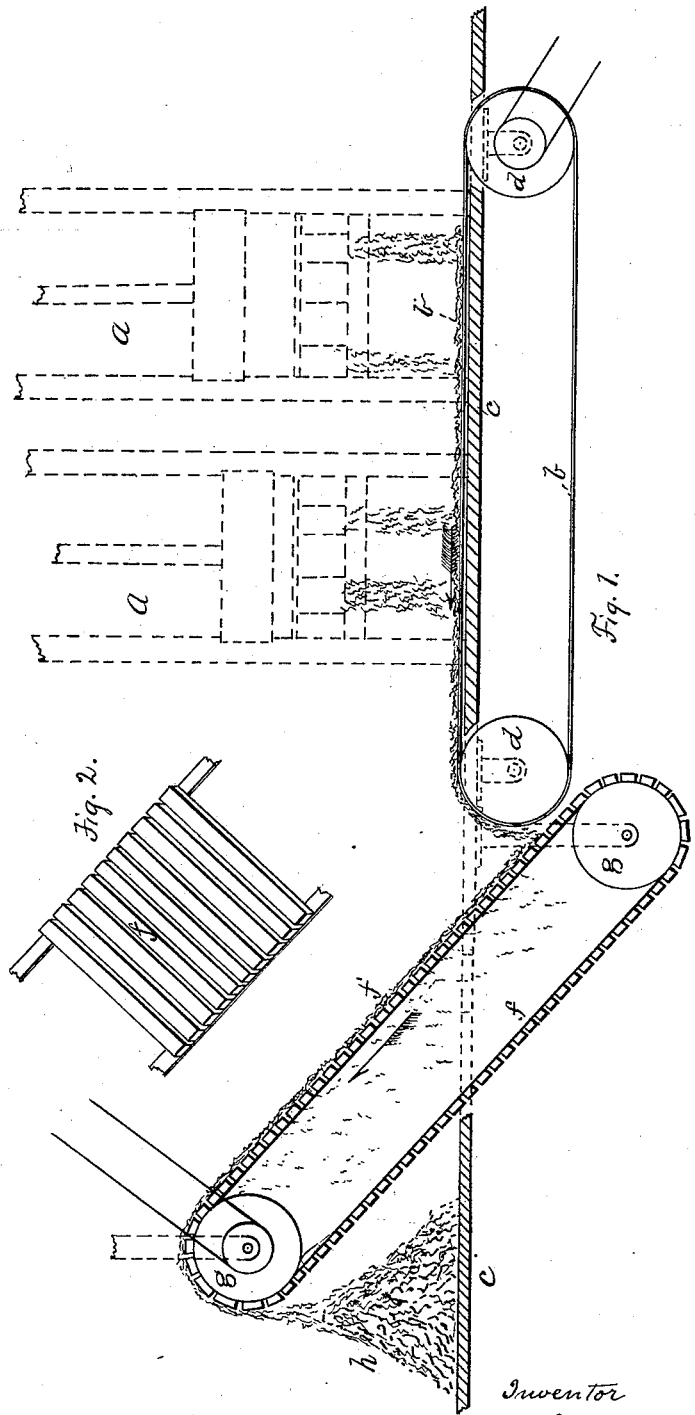

UNITED STATES PATENT OFFICE.

FRANK A. CUSHMAN, OF BOYD LAKE, MAINE.

EXCELSIOR CARRIER AND MIXER.

SPECIFICATION forming part of Letters Patent No. 245,941, dated August 23, 1881.

Application filed June 24, 1881. (No model.)

*To all whom it may concern:*

Be it known that I, FRANK A. CUSHMAN, of Boyd Lake, Orneville, in the county of Piscataquis and State of Maine, have invented certain new and useful Improvements in Excelsior Carrier and Mixer; and I do hereby declare that the following is a full, clear, and exact description of the invention, that will enable others skilled in the art to which it appertains to make and use the same, reference being had to the accompanying drawings, forming a part of this specification, in which—

Figure 1 shows an elevation; Fig. 2, a plan. Same letters show like parts.

My invention consists of an improved device for carrying excelsior from the machine by which it is manufactured to the baling-press, screening it at the same time, and, if more than one excelsior-machine is employed, mixing the products of the different machines in transit and equalizing the quality of the article.

My invention will be readily understood by reference to the accompanying drawings.

At *a a* are indicated excelsior-machines.

At *b* is an endless belt running near the floor *c* of the mill, and of sufficient width to receive the excelsior as it drops from the knives. This belt passes over pulleys *d d*, hung beneath the floor *c*, and receiving motion in any convenient manner from the machinery of the mill.

At *f* is a second endless belt or carrier, running on pulleys *g g*, one beneath the floor and the other elevated, giving the inclination shown, so that sufficient space shall be left beneath the end of the carrier for the deposit of the excelsior. The lower end of this belt is hung just below the end of the belt *b*, as shown. This belt or carrier is formed of slats or screen material, and, traveling in the same direction as the belt *b*, it receives the excelsior from it, carrying to its upper end and dropping it, as seen at *h*, the finer particles and dust meanwhile escaping through the interstices of the screen-carrier.

When two or more machines are employed the belt *b*, being in constant motion, receives the excelsior from each machine as it passes, thus thoroughly mingling it and equalizing the quality of the product.

I do not claim, broadly, an endless carrier, as I am aware that such devices are old.

The novelty of my invention consists in the combination, with two or more excelsior-machines, of an endless carrier, so arranged as to receive the excelsior as it passes the machines, thereby intimately mixing the same while being conveyed; and, second, in depositing said excelsior so mixed upon a second perforated carrier, conveying it to the required locality, and screening it in its passage.

What I claim as my invention is—

1. The endless carrier *b*, in combination with two or more excelsior-machines, so arranged with reference to said machines as to receive and mix the product as it passes them, delivering it so mixed when required, as set forth and shown.

2. The combination, with two or more excelsior-machines and an endless carrier, *b*, so arranged as to receive the product and mix the product thereof, of a perforated carrier, *a*, receiving said excelsior from the carrier *b*, and screening and delivering the same as required, substantially as set forth.

In testimony that I claim the foregoing I have hereunto set my hand this 28th day of May, 1881.

FRANK A. CUSHMAN.

Witnesses:
JACOB STETSON,
WM. FRANKLIN SEAVEY.